(12) United States Patent
Ryal

(10) Patent No.: US 7,292,512 B2
(45) Date of Patent: *Nov. 6, 2007

(54) SYSTEM USING RADIO FREQUENCY IDENTIFICATION (RFID) FOR COPY MANAGEMENT OF DIGITAL MEDIA

(75) Inventor: Kim Annon Ryal, Poway, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/361,291

(22) Filed: Feb. 23, 2006

(65) Prior Publication Data

US 2006/0174353 A1 Aug. 3, 2006

Related U.S. Application Data

(63) Continuation of application No. 10/781,563, filed on Feb. 17, 2004, now Pat. No. 7,038,985.

(51) Int. Cl.
*G11B 5/58* (2006.01)

(52) U.S. Cl. .............................. 369/53.21; 369/53.41; 369/53.45

(58) Field of Classification Search ...................... None
See application file for complete search history.

(56) References Cited

U.S. PATENT DOCUMENTS

| | | | |
|---|---|---|---|
| 5,905,798 A | 5/1999 | Nelikar et al. | |
| 6,005,940 A | 12/1999 | Kulinets | |
| 6,198,875 B1 | 3/2001 | Edenson et al. | |
| 6,201,474 B1 | 3/2001 | Brady et al. | |
| 6,615,192 B1 | 9/2003 | Tagawa et al. | |
| 6,801,490 B1 | 10/2004 | Sako et al. | |

OTHER PUBLICATIONS

Jack Brown, *Read/Write RFID Chips Boast Large Memory*, Microwaves & RF, ED online ID #6995, Dec. 2003, p. 1-2.
Kbecker, *No Copy Protection for CDS*, Halfbakery, Jul. 31, 2003, p. 1-3.

*Primary Examiner*—Paul W. Huber
(74) *Attorney, Agent, or Firm*—Trellis Intellectual Property Law Group, PC; Charles J. Kulas; Brian N. Young

(57) ABSTRACT

A readable and writable radio frequency identification (RFID) tag is attached to a physical medium such as a CDROM or DVD. Each time a copy of the medium is created, a variable or count stored in the writable RFID is updated. In cases where the mechanism for reading and writing the RFID is in communication with the device making a copy of the medium, the created copy can have its permitted number of copies set to zero, or other restrictions put in place. Or the device can be prevented from making any copies. In this manner the total number of copies of an original product can be regulated. The RFID can be read or written from a mechanism in a CDROM or DVD player or the read/write mechanism can be in a different device such as in a computer, or in another device.

21 Claims, 2 Drawing Sheets

SYSTEM USING RADIO FREQUENCY IDENTIFICATION (RFID) FOR COPY MANAGEMENT OF DIGITAL MEDIA

This application is a continuation of U.S. application Ser. No. 10/781,563, filed Feb. 17, 2004, now U.S. Pat. No. 7,038,985.

BACKGROUND OF THE INVENTION

This invention is related in general to processing of digital information and more specifically to a system for rights management of digital media including limiting the number of copies that can be made from a digital medium.

The digital format has quickly become the format of choice for many types of information including audio, video, computer data, etc. For example, today's Compact Disk Read-Only Memory (CDROM) media are used to store audio files such as songs, narration, etc., onto a small disc that can be played back with a CDROM drive. The CDROM can also be used to write and read video content and data files. Another popular media format is the Digital Versatile Disk (DVD) that is similar in basic approach to the CDROM in that it is a disc-shaped optical media that is read with a drive mechanism using a laser. The DVD format is becoming popular to deliver high-quality audio and video (e.g., full-length movies) content.

Other physical media formats exist such as a "memory stick" that uses flash-memory or another form of persistent solid-state random access memory (RAM). A mini-disc format uses magnetic media, as do the current form of "micro" hard disk drives. Other media formats exist such as magnetic, optical, solid state, etc.

Although digital media is a low-cost way to provide high-quality content to end users, such as listeners, viewers, or computer users, one problem with using digital media distribution is that the media can be easily copied. Typically the copying occurs without any additional compensation to the content owner, distributor or other controlling authority.

Some approaches are being considered to try to prevent unwanted copying. For example, a digital watermark approach puts identifying information in association with a physical medium, such as a CDROM, or can embed the identifying information in a portion (or throughout) the digital information on the medium. For example, bits can be used throughout a song to identify the owner of the content and to indicate any use restrictions. One problem with this approach is that the amount of bits for watermarking can take away from the capacity of the medium to store the intended content. Also, the watermarking can degrade the quality of the content.

Another approach is to use a separate, discrete portion of the medium to store copy control, or rights management information. The copy control information can be read and/or written by the drive mechanism (i.e., playback device), by a copying system such as a computer, or by other devices that may be used to write or read information on the medium. For example, a DVD can be provided with a "generation" count. That is a user can purchase an original DVD with a generation count of 3. When a first generation copy of the original DVD is made then the generation count on the first generation copy is set to 2. When a second generation copy is made the second generation copy has a count that is set to 1. When a third generation copy is made then the generation count is set to 0 and no further copies will be allowed.

While the generation count approach can have some success at preventing massive, exponentially growing numbers of copies from propagating, there can still be a very large number of copies spawned from the original DVD. For example, a purchase of the original DVD might make any number of first generation copies (e.g., one million or more) that will each have a generation count set to 2. With this approach it is not possible to limit the total number of copies deriving from any given-one of the original or subsequent first or second generation copies.

BRIEF SUMMARY OF THE INVENTION

A preferred embodiment of the invention uses a writable RFID tag embedded in a physical medium such as a CDROM or DVD. Each time a copy of the medium is created, a variable or count stored in the writable RFID is updated. In cases where the RFID read/write sensor is in communication with the device making a copy of the medium, the created copy can have its permitted number of copies set to zero, or other restrictions put in place. In this manner the total number of copies of an original product can be regulated.

The RFID can be read or written from a mechanism in a CDROM or DVD player. Or the read/write mechanism can be in a different device such as in a computer, or in another device. In a preferred embodiment, the RFID read/write mechanism works in conjunction with the CDROM or DVD drive so that copies of the medium can not be made without checking information in the RFID and updating the RFID data, as necessary. Encryption can be used to secure the copy count (e.g., with a hash, or other signature approach) with the content. Other approaches can use digital watermarks, authentication, password protection, etc., to prevent tampering with information in the RFID and defeating the copy control.

Copy Prevention Rights Management (CPRM) rules can be used in connection with the invention to regulate the medium as desired. Different embodiments of the invention can include other types of copy control information such as those described by Copy Control Information (CCI), Extended Copy Control Information (ExCCI), Copy Generation Management System (CGMS), and other standards. In general, any information relating to copy control or access rights can be used with embodiments of the present invention.

In one embodiment the invention provides A method for enforcing access rights to a medium, the method comprising permanently securing a read/write RFID to the medium; storing in the RFID an indication relating to access rights; detecting when a copy of the medium is selected to be made; reading the access rights indication; and if the indication meets a predetermined condition then enforcing access rights to the medium.

In another embodiment the invention provides a method for preventing copy protection in a medium, the method comprising permanently securing a read/write RFID to the medium; storing in the RFID an indication of the number of copies that can be made of the medium; detecting when a copy of the medium is selected to be made; reading the indication of the number of copies that can be made of the medium; if the indication meets a predetermined condition then preventing creation of a copy of the medium.

In another embodiment the invention provides an apparatus for preventing copy protection in a medium, the apparatus comprising a read/write RFID tag permanently secured to the medium; and a machine readable value stored in the RFID tag, wherein the value indicates a limit on the number of copies that can be made from the medium.

DETAILED DESCRIPTION OF THE INVENTION

Figure 1:
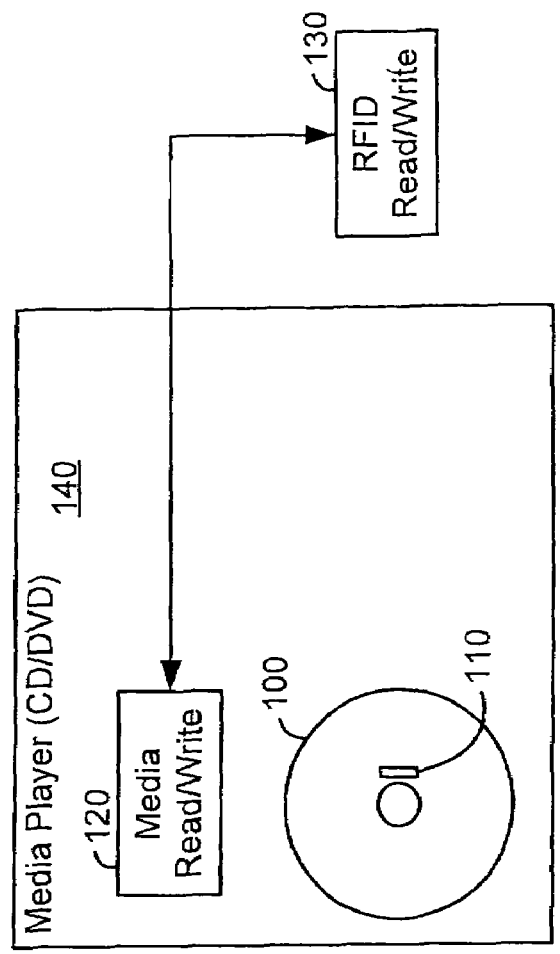
FIG. 1 illustrates a media player with internal RFID read/write unit.

FIG. 1 illustrates a preferred embodiment of the invention.

In FIG. 1, a machine readable storage medium such as DVD 100 is provided with a read/write RFID tag 110. Although the RFID tag in FIG. 1 is shown near the center hole of the DVD disc (in exaggerated size), the RFID tag can be mounted, affixed or embedded or otherwise coupled to a DVD disc as is practicable. For example, popular read/write RFID tags (e.g., manufactured by Texas Instruments, Maxell Corp. of America, etc.) can use an antenna on the RFID chip itself so that RFID tag sizes of under 2.5 mm square are possible. If the antenna is desired to be longer then the antenna can be placed anywhere on or in the disc as long as it does not interfere with the media operation. For example, the RFID chip and/or antenna can be placed on the top side of the DVD, edge, etc.

Media player 140 can be, e.g., a DVD player, in which case media read/write unit 120 is a subsystem within the DvD player. Also included in the DVD player is an RFID read/write (or sensor) unit 130. Depending on the RFID design and position, and on the design and sensitivity of RFID read/write unit unit 130, the RFID read/write unit unit may need to be in close proximity to the DVD disc. In such a case it may be desirable to mount RFID read/write unit components adjacent, onto, or in tandem with media read/write components. Especially where the RFID tag antenna is very small, the detection distance can be on the order of millimeters. The media read/write hardware for a DVD, for example, already requires a laser beam and detector assembly to be in close proximity with the DVD disc. RFID read/write unit components can be integrated with the laser emitter and/or detector, laser read head arm, housing, drive motor assembly, etc.

A user places a DVD disc, such as DVD disc 110, into the DVD player. At some point before, after or during a request to make a copy of the DVD disc, RFID read/write unit 130 reads copy control information from RFIG tag 110. For example, the RFID tag can include a number that represents the number of copies that can be made from the DVD disc. In a preferred embodiment, the RFID tag also includes an identification code for the DVD disc, itself. The DVD ID code is correlated to information stored optically on the disc, itself, so that the media read/write subsystem can obtain the correlated information. For example, a digital watermark, ID value, sample of audio or video data on the disc, etc., can be used to identify the DVD as containing information or content that is proprietary to a manufacturer, distributor or other entity.

Matching of the RFID tag ID code and the correlated information on the medium is performed by a control system (not shown). If the ID code and correlated information match then positive identification of the DVD disc is said to have occurred and the copy control information from the RFID tag is obtained and used to permit or restrict different types of uses of the DVD. For example, where a "number of copies" (NOC) value is used, then a check for positive identification of the disc may not take place until a point in time when a user request (or automated request) is received to make a copy of the DVD. Then, if positive identification is made, the NOC value is checked by the RFID read/write unit to determine if it is greater than zero.

If the NOC value is greater than zero, a signal is generated (e.g., from the RFID read/write Unit device to the control system or media read/write subsystem) to permit the media player to make a copy of the DVD. At a time of granting permission to make a copy, or at a step during or after the process of making a copy, the NOC value is decremented and updated to the RFID tag.

One embodiment of the invention contemplates using security techniques such as public key encryption, digital signatures, authentication, etc. to verify that the information obtained from the RFID tag is genuine, and has not been tampered. In general, any type of security approaches can be used.

Figure 2:
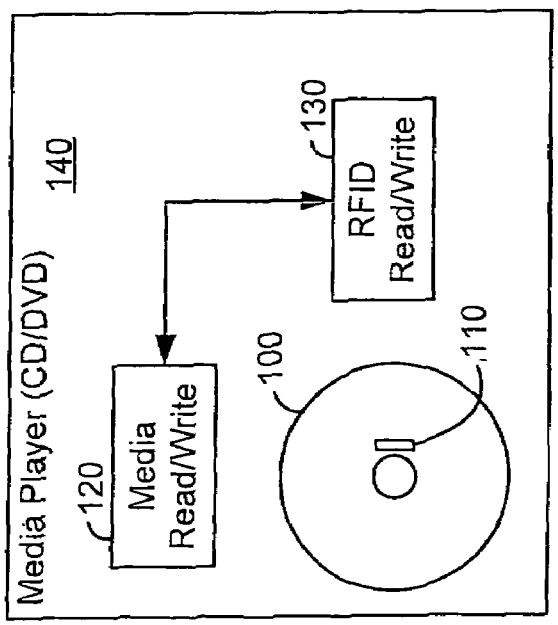
FIG. 2 illustrates a media player with external RFID read/write unit.

FIG. 2 illustrates an embodiment where the RFID read/write unit is external to the media player. For example, the RFID read/write unit can be a unit manufactured and sold separately from the media player and can be in communication with the media player, and the media player's media read/write subsystem, via wired, wireless, optical or other communication links.

In cases where the RFID detection and transmission range is sufficient, operation of the system can be as above, where the RFID read/write unit is internal to the media player. In cases where the RFID read/write unit is not able to read or write the RFID tag when the media is inside the media player, a user can place the media in proximity to the RFID read/write unit and to the media read/write subsystem of the media player at different times.

For example, a user can place a DVD in proximity to the RFID read/write unit so that the sensor can obtain the RFID tag ID code. Next the user can place the DVD into the DVD player where the correlated information is obtained so that the system can verify that the DVD disc corresponds to the copy control information. Next the user places the DVD disc, again, near the RFID read/write unit and a blank DVD is inserted into the media player (or another recording device). While (or after) detecting the DVD's RFID tag NOC value and determining that copies can be made, the system sends a signal to a DVD write mechanism to write, or copy, a new DVD disc. The original DVD's NOC value is updated, accordingly. Note that variations in the order of steps are possible. Also, steps can be modified or omitted while achieving a desired result. For example, the last step of placing the DVD in proximity to the RFID read/write unit can be omitted and the RFID information can be checked and updated in the first step, although this approach may be less secure.

Figure 4:
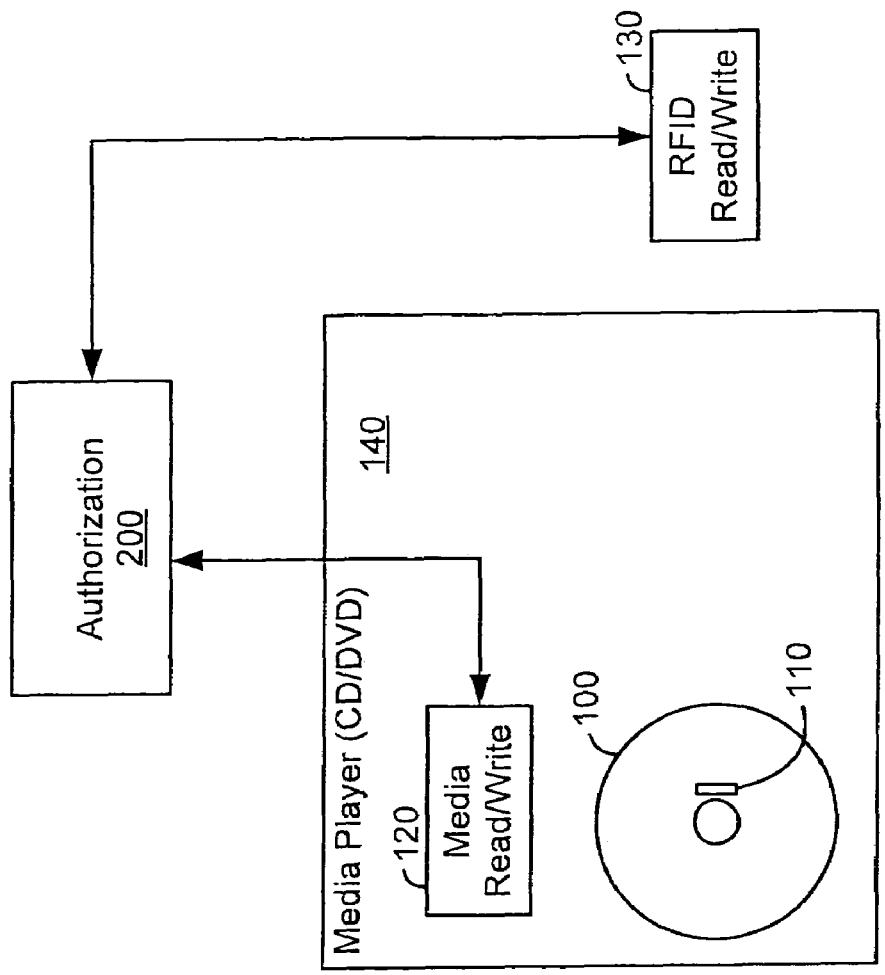
FIG. 4 illustrates a media player and external RFID read/write unit connected to a remote authorization process.
Figure 3:
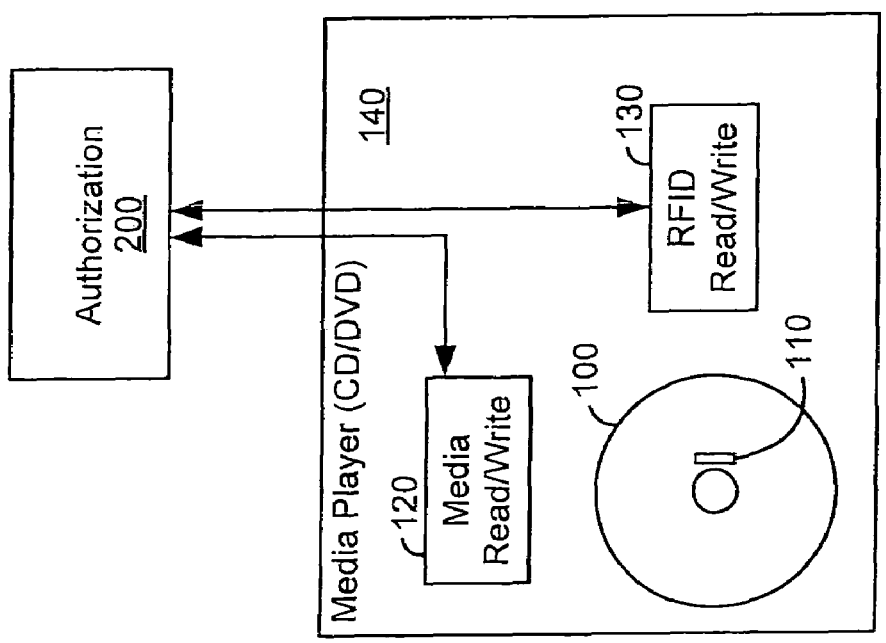
FIG. 3 illustrates a media player and internal RFID read/write unit connected to a remote authorization process.

FIGS. 3 and 4 illustrate systems where an internal (FIG. 3) or external (FIG. 4) RFID read/write unit and the media read/write subsystem are in communication with an external authorization process 200. For example, authorization process 200 can be at a remote location and communication among media read/write unit 120, RFID read/write unit 130 and the authorization process can be over a network such as the Internet. This approach provides additional monitoring, control and security options. For example, the step of matching correlated information on a DVD with an RFID ID code can be performed at the authorization process. Additional rules or information stored at a remote location can be used in an authorization grant. For example, detection of the location of the media player can be made by knowledge of the routing of a message transfer over the Internet, by obtaining cooperation of a user's Internet Service Provider (ISP), etc. In this approach, authorization process 200 can refuse to permit copying of certain media types based on the detected (or provided) location of the media player or other copy device.

Although the invention has been described with respect to specific embodiments thereof, these embodiments are merely illustrative, and not restrictive, of the invention. For example, although the invention has been discussed primarily with respect to optical discs such as CDROMs or DVDs, any type of storage media and media read/write device can be used including magnetic, optical, solid state, etc.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A medium for enforcing copy protection, the medium comprising:
    a read/write RFID secured to the medium, the RFID including an indication of the number of copies that can be made of the medium,
    wherein the indication of the number of copies that can be made of the medium is usable to determine if the indication meets a predetermined condition, wherein the condition is determinable at least in part by communicating with an authorization process via a digital network, thus preventing creation of a copy of the medium.

2. The medium of claim 1, wherein the indication is updateable in the RFID.

3. The medium of claim 2, wherein the RFID includes a copy restriction that is set for the copy of the medium.

4. The medium of claim 3, wherein the copy restriction prevents copies of the copy of the medium from being created.

5. The medium of claim 1, wherein the medium includes a CDROM disc or a DVD disc.

6. A medium for enforcing access rights, the medium comprising:
    a read/write RFID secured to the medium, wherein the RFID includes an indication relating to access rights,
    wherein when a copy of the medium is selected to be made, if the access rights indication meets a predetermined condition, wherein the condition is determined at least in part by communicating with an authorization process via a digital network, then access rights to the medium is enforced.

7. The medium of claim 6, wherein the access rights are in accordance with a Copy Control Information (CCI) standard.

8. The medium of claim 6, wherein the access rights are in accordance with an Extended Copy Control Information (ExCCI) standard.

9. The medium of claim 6, wherein the access rights are in accordance with Copy Generation Management System (CGMS).

10. The medium of claim 6, wherein the access rights include a restriction on the number of copies that can be made of content on the medium.

11. The medium of claim 6, wherein the medium includes a CDROM disc or a DVD disc.

12. A medium for authorizing a copy, the medium comprising:
    a RFID secured to the medium including a first RFID tag value and a second RFID tag value;
    correlating information stored on the medium,
    code for allowing the first RFID tag value to be compared to the detected correlating information to determine if there is a correlation,
    wherein if a correlation is determined then code for allowing the second RFID tag value to be read; and
    wherein if the detected second RFID tag value meets a predetermined condition, wherein the condition is determined at least in part by communicating with an authorization process via a digital network, code for authorizing a copy of the medium if the correlation is determined.

13. The medium of claim 12, wherein the correlating information includes an indentification code.

14. The medium of claim 12, wherein the correlating information includes a digital watermark.

15. The medium of claim 12, wherein the detected second RFID tag value is encrypted.

16. The medium of claim 12, wherein the medium includes a CDROM disc or a DVD disc.

17. A method for enforcing copy protection in a medium, the method comprising:
    permanently securing a read/write RFID to the medium;
    storing in the RFID an indication of the number of copies that can be made of the medium;
    when a copy of the medium is selected to be made, providing the indication of the number of copies that can be made of the medium, if the indication meets a predetermined condition, wherein the condition is determined at least in part by communicating with an authorization process via a digital network, the creation of a copy of the medium is prevented.

18. The method of claim 17, further comprising
receiving update information for the indication in the RFID that updates the indication with the update information.

19. The method of claim 18, further comprising
setting a copy restriction in the copy of the medium.

20. The method of claim 19, wherein the copy restriction includes preventing copies of the copy of the medium from being created.

21. The method of claim 17, wherein the medium includes a CDROM disc or a DVD disc.

* * * * *